(12) United States Patent
Labey

(10) Patent No.: US 11,520,458 B2
(45) Date of Patent: Dec. 6, 2022

(54) COMMUNICATIONS INTERFACE AND A COMMUNICATIONS METHOD, A CORRESPONDING COMPUTER PROGRAM, AND A CORRESPONDING REGISTRATION MEDIUM

(71) Applicant: Glowbl, Lyons (FR)

(72) Inventor: Mathieu Nicolas Labey, Brignais (FR)

(73) Assignee: GLOWBL, Lyons (FR)

( * ) Notice: Subject to any disclaimer, the term of this patent is extended or adjusted under 35 U.S.C. 154(b) by 0 days.

(21) Appl. No.: 17/211,798

(22) Filed: Mar. 24, 2021

(65) Prior Publication Data
US 2021/0208766 A1    Jul. 8, 2021

Related U.S. Application Data

(60) Continuation of application No. 16/809,129, filed on Mar. 4, 2020, now Pat. No. 10,983,664, which is a
(Continued)

(51) Int. Cl.
*G06F 3/04815*    (2022.01)
*H04L 67/14*    (2022.01)
(Continued)

(52) U.S. Cl.
CPC .......... *G06F 3/04815* (2013.01); *H04L 51/52* (2022.05); *H04L 65/403* (2013.01);
(Continued)

(58) Field of Classification Search
CPC . A63F 2300/5553; G06N 3/006; G06T 13/40; H04L 12/1813; H04L 12/581; H04N 7/157
See application file for complete search history.

(56) References Cited

U.S. PATENT DOCUMENTS

| | | | | |
|---|---|---|---|---|
| 5,533,110 A | * | 7/1996 | Pinard | H04M 1/27475 379/355.01 |
| 6,323,857 B1 | * | 11/2001 | Mielekamp | H04N 7/15 345/419 |

(Continued)

OTHER PUBLICATIONS

International Preliminary Report on Patentability dated May 6, 2014 in connection with PCT International Application No. PCT/IB2011/003209.
(Continued)

*Primary Examiner* — Ryan F Pitaro
(74) *Attorney, Agent, or Firm* — John P. White

(57) ABSTRACT

The invention provides a communications interface for communications between participants, said interface including a virtual space (1) and graphical avatars (2, 3) that firstly represent respective ones of said participants and secondly are designed to move in said virtual space (1), said communications interface also including control means for controlling the movement of each graphical avatar, said communications interface being characterized in that it is designed to set up a discussion channel automatically between two of said participants when either the distance (d) between the two graphical avatars (2, 3) representing respective ones of said two participants is less than or equal to a predetermined first value (D1), or the distances between a graphical object and each of the two graphical avatars (2, 3) are less than or equal to a second predetermined value. Communications interfaces.

20 Claims, 4 Drawing Sheets

Related U.S. Application Data division of application No. 14/355,169, filed as application No. PCT/IB2011/003209 on Nov. 3, 2011, now Pat. No. 10,620,777.

(51) Int. Cl.
| | |
|---|---|
| *H04M 1/72427* | (2021.01) |
| *H04L 51/52* | (2022.01) |
| *H04L 67/131* | (2022.01) |
| *H04L 65/403* | (2022.01) |
| *H04N 7/15* | (2006.01) |
| *H04M 1/72436* | (2021.01) |

(52) U.S. Cl.
CPC ............ *H04L 67/131* (2022.05); *H04L 67/14* (2013.01); *H04M 1/72427* (2021.01); *H04N 7/157* (2013.01); *H04M 1/72436* (2021.01)

(56) References Cited

U.S. PATENT DOCUMENTS

| | | | | |
|---|---|---|---|---|
| 6,559,863 B1* | 5/2003 | Megiddo | H04L 12/1827 | 348/14.08 |
| 7,213,206 B2* | 5/2007 | Fogg | G06Q 10/10 | 715/706 |
| 7,386,799 B1* | 6/2008 | Clanton | A63F 13/12 | 715/758 |
| 7,478,129 B1* | 1/2009 | Chemtob | H04L 12/1827 | 709/204 |
| 7,840,668 B1* | 11/2010 | Sylvain | A63F 13/54 | 709/224 |
| 7,840,903 B1* | 11/2010 | Amidon | H04L 67/306 | 715/757 |
| 8,026,918 B1* | 9/2011 | Murphy | H04L 67/38 | 345/473 |
| 8,144,633 B2* | 3/2012 | Yoakum | H04L 65/4015 | 370/261 |
| 8,260,873 B1* | 9/2012 | Kandekar | H04L 67/38 | 709/209 |
| 8,397,168 B2* | 3/2013 | Leacock | G06T 13/80 | 715/757 |
| 8,806,364 B2* | 8/2014 | Hwang | G06F 3/0481 | 715/790 |
| 8,938,677 B2* | 1/2015 | Geppert | H04M 1/27475 | 715/734 |
| 9,117,316 B1* | 8/2015 | Crutchfield, Jr. | G06T 13/205 | |
| 9,344,396 B2* | 5/2016 | Geppert | H04M 1/27475 | |
| 10,484,328 B2* | 11/2019 | Kimura | G06F 3/04817 | |
| 2003/0001890 A1* | 1/2003 | Brin | H04L 12/1822 | 715/753 |
| 2006/0252531 A1* | 11/2006 | Kando | A63F 13/56 | 463/30 |
| 2008/0148156 A1* | 6/2008 | Brewer | H04L 41/22 | 715/738 |
| 2008/0204448 A1* | 8/2008 | Dawson | G06Q 30/02 | 345/419 |
| 2008/0215994 A1* | 9/2008 | Harrison | A63F 13/42 | 715/757 |
| 2008/0263460 A1* | 10/2008 | Altberg | G06Q 30/02 | 715/757 |
| 2009/0019385 A1* | 1/2009 | Khatib | G06F 9/451 | 715/765 |
| 2009/0054107 A1* | 2/2009 | Feland, III | G06F 3/04883 | 455/564 |
| 2009/0210803 A1* | 8/2009 | Brignull | H04L 69/24 | 715/757 |
| 2009/0259539 A1* | 10/2009 | Dawson | G06Q 30/0261 | 705/14.4 |
| 2009/0300518 A1* | 12/2009 | Mock | H04N 7/173 | 715/753 |
| 2009/0307620 A1* | 12/2009 | Hamilton, II | A63F 13/79 | 715/764 |
| 2010/0064253 A1* | 3/2010 | Bates | G06F 3/0481 | 715/810 |
| 2010/0138763 A1* | 6/2010 | Kim | G06F 3/04817 | 715/765 |
| 2010/0153499 A1* | 6/2010 | Dawson | H04L 12/1822 | 709/206 |
| 2010/0216448 A1* | 8/2010 | Jeon | G06F 3/0488 | 455/418 |
| 2010/0246571 A1* | 9/2010 | Geppert | G06F 3/04817 | 370/352 |
| 2010/0246800 A1* | 9/2010 | Geppert | H04W 4/21 | 379/265.09 |
| 2010/0262928 A1* | 10/2010 | Abbott | H04M 1/72436 | 715/769 |
| 2011/0271332 A1* | 11/2011 | Jones | H04L 9/3247 | 726/7 |
| 2011/0296312 A1* | 12/2011 | Boyer | G06F 3/0488 | 715/736 |
| 2012/0023397 A1* | 1/2012 | Leichtberg | G06F 3/0482 | 715/234 |
| 2012/0137231 A1* | 5/2012 | Maxfield | H04M 1/72469 | 715/753 |
| 2012/0179997 A1* | 7/2012 | Miyazaki | G06F 3/0486 | 715/830 |
| 2013/0073978 A1* | 3/2013 | Butler | H04L 51/043 | 715/741 |
| 2013/0084978 A1* | 4/2013 | Olomskiy | A63F 13/5372 | 463/31 |
| 2014/0115502 A1* | 4/2014 | Van Wie | H04L 65/403 | 715/757 |
| 2014/0331149 A1* | 11/2014 | Labey | H04M 1/72427 | 715/757 |
| 2016/0048310 A1* | 2/2016 | Patil | H04M 1/72412 | 715/716 |
| 2016/0077708 A1* | 3/2016 | Han | G06F 3/04817 | 715/846 |
| 2016/0300387 A1* | 10/2016 | Ziman | G06F 3/147 | |
| 2019/0278442 A1* | 9/2019 | Liang | G05B 19/042 | |

OTHER PUBLICATIONS

International Search Report dated May 11, 2012 in connection with PCT International Application No. PCT/IB2011/003209.
Written Opinion of the International Searching Authority dated May 11, 2012 in connection with PCT International Application No. PCT/IB2011/003209.

* cited by examiner

COMMUNICATIONS INTERFACE AND A COMMUNICATIONS METHOD, A CORRESPONDING COMPUTER PROGRAM, AND A CORRESPONDING REGISTRATION MEDIUM

CROSS-REFERENCE TO RELATED APPLICATIONS

This application is a continuation of U.S. patent application Ser. No. 16/809,129, filed. Mar. 4, 2020, now allowed, a divisional of U.S. patent application Ser. No. 14/355,169, filed Jul. 18, 2014, now U.S. Pat. No. 10,620,777, issued Apr. 14, 2020, a § 371 national stage of POT international Application No. PCT/IB2011/003209, filed Nov. 3, 2011, the contents of each of which are hereby incorporated by reference herein.

TECHNICAL FIELD

The present invention relates to the general technical field of communications interfaces enabling a plurality of users situated apart from one another to chat or to exchange data, preferably in real time, e.g. by means of networked terminals.

The present invention relates more particularly to a communications interface for communications between participants having respective screens available to them, said interface including a virtual space and graphical avatars that firstly represent respective ones of said participants and secondly are designed to move in said virtual space, said virtual space and said graphical avatars being designed to be displayed on said screens, said communications interface also including control means enabling each of the participants to control the movements of their respective graphical avatars.

The present invention also relates to a communications method for communications between participants having respective screens available to them, in which method;
  a virtual space and graphical avatars that represent respective ones of said participants are displayed on said screens; and
  each of the participants controls the movements of their respective graphical avatars in said virtual space.

The invention also relates to a computer program including computer program code means adapted to execute the steps of a method as defined above when said program is executed on a computer, and the invention also relates to a computer-readable medium on which such a program is recorded.

PRIOR ART

There exist numerous solutions enabling people situated apart from one another to communicate via terminals (personal computers (PCs), smartphones, touchscreen tablets, etc.) connected to the Internet.

For example, there exists chat software that enables users to dialogue on-line by inputting the texts of their participations using the keyboards or keypads of their terminals. Such chat software, which is well known per se, also generally has an audio-video dialogue function enabling the participants in a discussion to see and to hear their correspondents, with the webcam and the microphone equipping the computer of each of the participants capturing their images and picking up their sound.

Although such chat software is generally satisfactory, it nevertheless suffers from certain drawbacks.

Firstly, the interface procure by such software can appear unclear, with unsatisfactory legibility, in particular during group discussions. In addition, known chat software does not make it possible to start a discussion in easy and impromptu manner, in particular with unknown attendees. Finally, such software is based on a technology that requires a program to be installed in each client terminal, which is source of complications. Known chat software does not therefore constitute a communications interface that is fully satisfactory, in particular for organizing group discussions easily.

There also exists videoconference software that enables remote users to be put into audiovisual communication, via their computers, with one or more correspondents. However, known videoconference software is generally relatively complex to grasp, relatively expensive to use (group videoconferencing generally being a pay service), and does not make it possible to start an audio-video discussion in simple and impromptu manner, in particular a hitherto unknown attendee. In addition, such videoconference software generally needs to be installed on the client terminals, in the same way as chat software does.

Currently known chat and videoconference software is not very user-friendly or intuitive, and, in particular, it does not facilitate unplanned contacts with new people.

Social networks deployed over the Internet are also known. However, such social networks do not make it possible to have group discussions in easy and simple manner, or to start a discussion in improvised manner with a member of the network who has not previously and duly been registered in a list of contacts or "friends". In addition, such social network interfaces do not make it possible to organize videoconferences in simple manner, or to organize virtual events in simple and Intuitive manner.

Finally, three-dimensional (3D) virtual worlds are also known, such worlds being implemented both for games and for social networks, and enabling users connected to the Internet to browse a realistic virtual environment via avatars, each embodying a respective user. The software that implements such virtual worlds enables users to dialogue with one another in conventional chat manner (dialogues input on the keyboard or keypad) via their avatars. Such 3D virtual worlds are quite appealing because they propose a very realistic environment, but they generally require a long learning time (often longer than three hours) so that they are suitable only for initiated users. In addition, such software does not make it possible to share content (files and other content) and using them is more like network gaming rather than using a simple and intuitive communications interface.

SUMMARY OF THE INVENTION

Objects assigned to the invention are therefore to remedy the above-mentioned drawbacks, and to propose a novel communications interface that is very user-friendly and intuitive, easy to learn to use without any particular skills being required, and that makes it possible, in particular, to implement group discussions extremely legibly and dynamically, while also facilitating impromptu exchanges with unknown attendees as well as discussions about topics of common interest.

Another object of the invention is to propose a novel communications interface that enables each of its users to have a View of discussion groups that is extremely clear, dynamic, and intuitive.

Another object of the invention is to propose a novel communications interface that is very easy to use and that consumes little memory and lithe computing power.

Another object of the invention is to propose a novel communications interface that makes it possible to chat both via text-based chat means and via videoconferencing means in simultaneous and very simple manner, regardless of the number of attendees.

Another object of the invention is to propose a novel communications interface that makes it possible to create discussion groups very quickly, simply, and intuitively.

Another object of the invention is to propose a novel communications interface that improves what social networks can offer and how user-friendly they are.

Another object of the invention is to propose a novel communications interface that makes it possible to organize virtual events in very simple and intuitive manner.

Another object of the invention is to propose a novel communications method, a novel computer program adapted to execute the steps of such a method, and a novel medium suitable for being computer-read and on which such a program is recorded, that make it possible to achieve the various above-mentioned advantages.

The objects assigned to the invention are achieved by means of a communications interface for communications between participants having respective screens available to them, said interface including a virtual space and graphical avatars that firstly represent respective ones of said participants and secondly are designed to move in said virtual space, said virtual space and said graphical avatars being designed to be displayed on said screens, said communications interface also including control means enabling each of the participants to control the movements of their respective graphical avatars, said communications interface being characterized in that it is designed to set up a discussion channel automatically between two of said participants when either the distance between the two graphical avatars representing respective ones of said two participants is less than or equal to a predetermined first value, or the distances between a graphical object positioned in said virtual space and secondly each of the two graphical avatars representing respective ones of said two participants are less than or equal to a second predetermined value, setting up said discussion channel enabling said two participants to converse with each other.

The objects assigned to the invention are also achieved by means of a communications method for communications between participants having respective screens available to them, in which method:
  a virtual space and graphical avatars that represent respective ones of said participants are displayed on said screens; and
  each of the participants controls the movements of respective graphical avatars in said virtual space;
said communications method being characterized in that a discussion channel is set up automatically between two of said participants when either the distance between the two graphical avatars representing respective ones of said two participants is less than or equal to a first predetermined value, or the distances between a graphical object positioned in said virtual space and each of the two graphical avatars representing respective ones of said two participants are less than or equal to a second predetermined value; setting up said discussion channel enabling said two participants to converse with each other.

The objects assigned to the invention are also achieved by means of a computer program including computer program code means adapted to execute the steps of the above-defined method.

The objects assigned to the invention are also achieved by means of a computer readable medium on which a program as defined above is recorded.

BRIEF DESCRIPTION OF THE DRAWINGS

Other objects and advantages of the invention appear in more detail on reading the following description with reference to the accompanying drawings that are given merely by way of non-limiting illustration, and in which.

BEST MANNER OF IMPLEMENTING THE INVENTION

Figure 1:
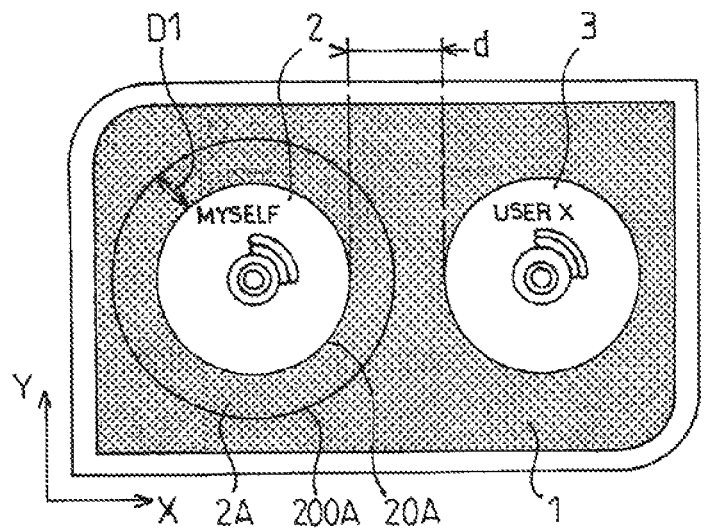
FIG. 1 is a portion of a screenshot of a participant's screen, showing the graphical avatar of the participant in question and another graphical avatar representing another participant, said graphical avatars being separated by a distance greater than the above-mentioned first predetermined value.

In a first aspect, the invention relates to a communications interface between participants having respective screens available to them. The screen in question may, for example, be a PC monitor, a graphics tablet pad, a telephone or smartphone screen, or indeed a television set screen. Preferably, each of the screens of said participants acts as a display peripheral and is functionally connected to a central processing unit (CPU) including, for example, at least one processor and memories (Random Access Memory(ies) (RAM(s)), Read-Only Memory(ies) (ROM(s)), etc.). Each participant's screen may be either an output peripheral that performs a display function only (as applies when the screen in question is a conventional computer monitor or TV screen), or an input/output peripheral (as applies when the screen in question is a touchscreen implemented, for example. In a graphics tablet or in a smartphone). When the screen is an output peripheral only, the participant in question also preferably has input peripherals (e.g.: keyboard/keypad, mouse, scroll wheels, etc.). Each screen preferably makes it possible to display in color and advantageously constitutes the peripheral of a CPU (be it a CPU of a computer, of a graphics tablet, of a smartphone, or of some other item of equipment) connected to a telecommunications network that is preferably the Internet, Each participant's screen is advantageously part of the communications interface of the invention.

As shown in the figures, the communications interface of the invention also includes a virtual space 1 designed to be displayed on each of the participants' screens, preferably simultaneously. Preferably, in order to make the interface particularly simple and legible, the virtual space 1 is two-dimensional (2D), and is thus advantageously in the form of a surface extending in only two spatial directions (the horizontal direction X and the vertical direction Y) so as to be included in a single plane that is advantageously the display plane of each participant's screen. In the description below, for reasons of simplicity and of conciseness, reference is made to a two-dimensional virtual space only, it being understood that it is quite possible for said virtual space 1 to be three-dimensional, or even one-dimensional.

The communications interface of the invention also includes graphical avatars (designated in the figures by references 2 to 11) that firstly represent respective ones of said participants and that secondly are designed to move in said virtual space 1. Like the virtual space 1, the graphical avatars 2-11 are also designed to be displayed on the respective screens available to the participants, so that the participants can see, on their screens and at the same time, the virtual space 1 and the graphical avatars 2-11, which are positioned and can move on the surface of the two-dimensional virtual space 1, as shown in the figures. The term "graphical avatar" is used herein to designate a virtual object that visually embodies the corresponding participant in the virtual space 1. The two-dimensional virtual space 1 thus advantageously constitutes a background or screen wallpaper, on which the graphical avatars 2-11 move. Preferably, said graphical avatars 2-11 are two-dimensional as shown in the figures. In other words, each graphical avatar 2-11 advantageously extends exclusively in a single plane that is common to all of the graphical avatars, said plane being parallel to the plane in which the two-dimensional virtual space 1 extends. In the accompanying figures, the plane in question corresponds to the plane of each sheet of drawings. Thus, the graphical avatars 2-11 are superposed on the two-dimensional virtual space 1 in such a manner as to move in a plane parallel to the plane in which the two-dimensional virtual space 1 extends.

This use of a virtual space 1 and of graphical avatars 2-11 that are all two-dimensional is preferred because it imparts simplicity of use and excellent user-friendliness to the communications interface. However, it is quite possible for the graphical avatars 2-11 to be three-dimensional rather than two-dimensional (which does not preclude them moving in a two-dimensional virtual space 1). The Invention thus covers any type of visual rendering (2D, 2.5D, 3D, isometric 3D, etc.).

Said communications interface also includes control moans enabling each of the participants to control the movements of their respective avatars 2-11. In other words, each of the participants has control means enabling them to move their own avatars 2-11 over the screen in controlled manner. The control means in question may, for example, be constituted by an input peripheral such as a mouse or a touchscreen (the touchscreen then acts both as screen and as control means in the meaning of the invention). Using the control means in question, each of the participants can thus cause the positions of their respective avatars to vary in the two-dimensional virtual space 1, e.g. so as to move towards or away from another avatar or group of avatars. The communications interface of the invention is thus advantageously a graphical user interface (GUI). It also appears from the above that the interface of the invention is advantageously a direct manipulation interface, i.e. an interface that, in particular, enables its users to manipulate (via a mouse or via a touchscreen, for example) graphical objects (their respective avatars in this example) directly in the same way as they would manipulate physical objects in the real world. The advantage of using a direct manipulation interface lies, in particular. In the Intuitive nature of such an interface, enabling each of the participants using the interface to visualize in real time the results of their own actions, and, for example, the results of actions for controlling the movements of their avatars. Preferably, the control means are designed to enable users to move their graphical avatars by dragging and dropping them. The participants can thus point to their respective graphical avatars as displayed on the screens (either directly using a finger for a touchscreen, or else using a mouse pointer, for example), and then drag their avatars towards respective chosen new positions, into which users drop their avatars (by not touching the screen when the screen is a touchscreen, or by ceasing to press the left buttons of the mouse, for example).

Figure 2:
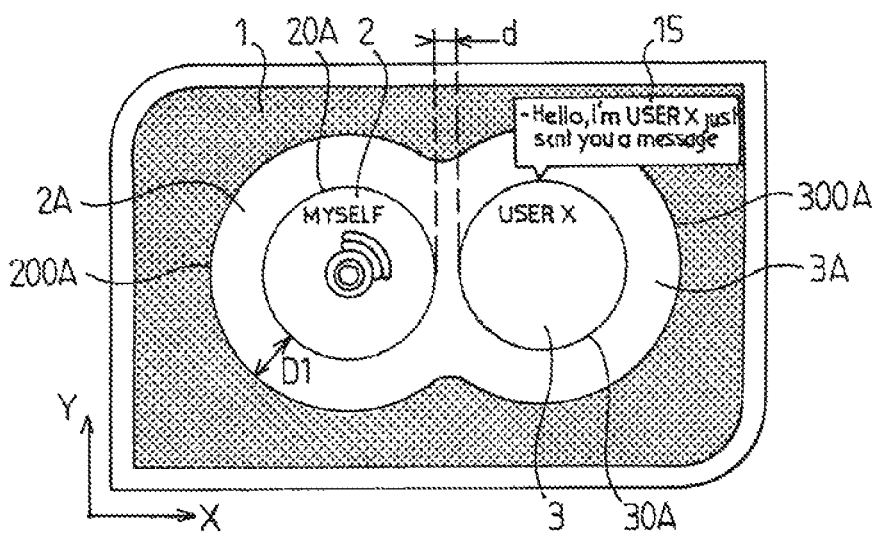
FIG. 2 is the same screenshot portion as shown in FIG. 1 except that the two avatars in question are separated by a distance that is less than or equal to the first predetermined value, so that a communications channel is set up between them.
Figure 3:
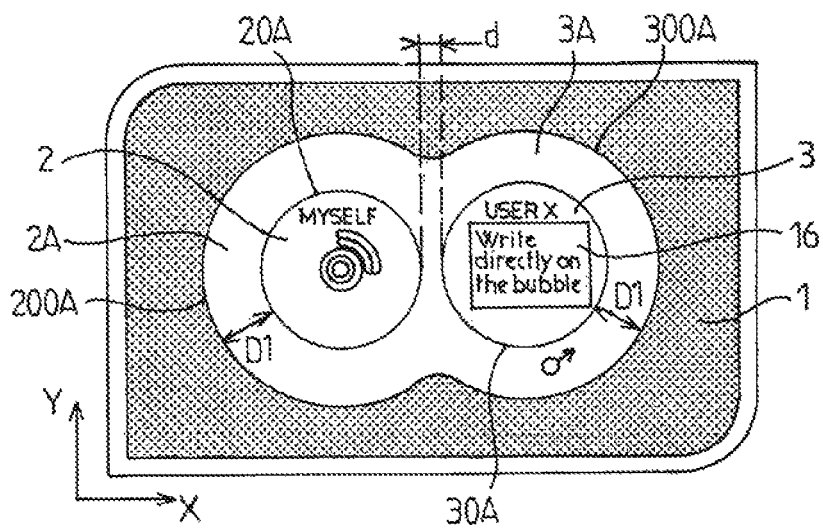
FIG. 3 shows the same screenshot portion as shown in FIG. 2 except that a chat window is displayed on one of the avatars in order to enable the corresponding participant to input text with a view to starting a discussion with other avatars.

In accordance with the invention, and as shown in FIGS. 1 to 3, the communications interface is designed to set up a discussion channel automatically between two of said participants who are using the interface when the distance d between the two graphical avatars 2, 3 respectively representing those two participants is less than or equal to a first predetermined value D1.

Figures 10, 11:
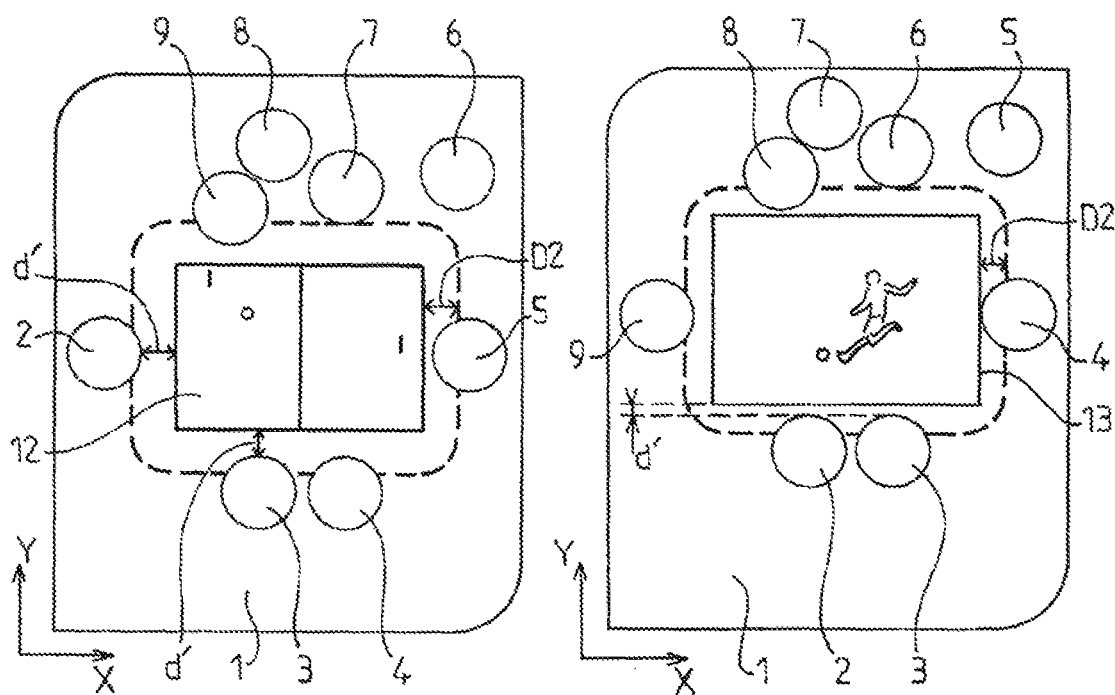
FIG. 10 is a diagrammatic view showing avatars gathered around a graphic object corresponding to a game of tennis.
FIG. 11 is a diagrammatic view showing avatars gathered around a window displaying a televised football match.
Figure 12:
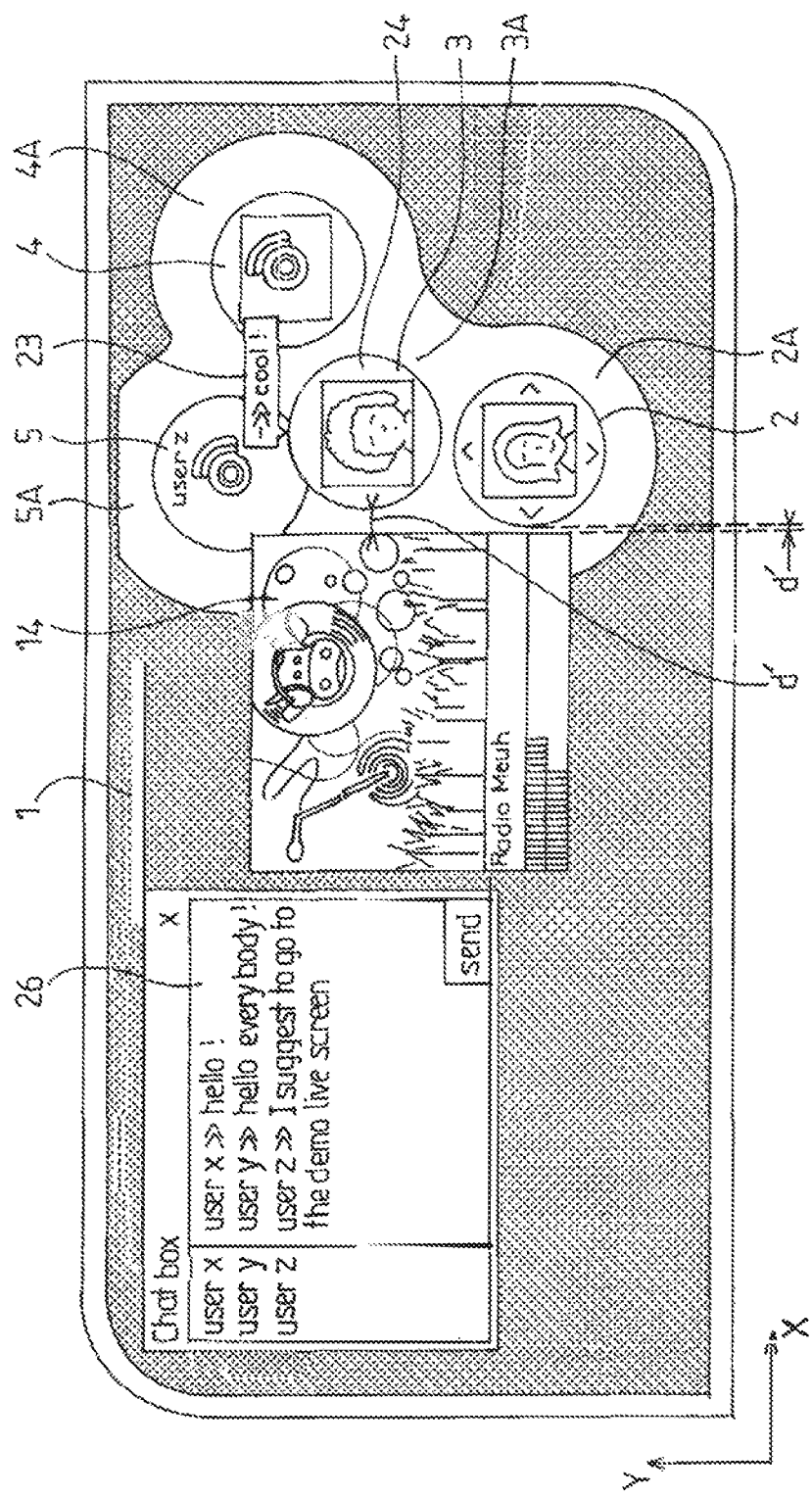
FIG. 12 is a screenshot portion showing a discussion group formed of four avatars, graphic object formed of a window displaying a radio station logo and broadcasting the programs of the station in question, and a window displaying, in real time, all of the chat exchanges between the members of the discussion group.

In accordance with the invention, and as shown in particular by FIGS. 10 to 12, the communications interface is also designed to set up a discussion channel automatically between two of said participants when the distances d' between a graphical object 12, 13, 14 positioned in said two-dimensional virtual space 1 and each of the two graphical avatars 2, 3 respectively representing said two participants are less than or equal to a second predetermined value D2. In this second possibility, a discussion channel is thus set up by the interface whenever both of the following conditions are satisfied:

the distance d' between the graphical object 12, 13, 14 and one of the two graphical avatars 2 in question is less than or equal to the second predetermined value D2; and the distance d' between the other graphical avatar 3 in question and the graphical object 12, 13, 14 is also less than or equal to the second predetermined value D2.

When both of these conditions are satisfied, it is thus possible for a communications channel to be set up automatically between the two graphical avatars 2, 3 in question, thereby enabling the two participants represented by the graphical avatars 2, 3 in question to converse with each other.

The communications interface of the invention is thus designed to set up a discussion channel automatically between two participants using the interface in question when one and/or the other of the following two situations A and B occurs:

A) the distance d between the two graphical avatars 2, 3 respectively representing said two participants is less than or equal to the first predetermined value D1; and B) the distances d' between the graphical object 12, 13, 14 positioned in two-dimensional space 1 and each of the two graphical avatars 2, 3 respectively representing said two participants are less than or equal to the second predetermined value D2;

said discussion channel being set up enabling said two participants to converse with each other by any known means (chat means, video-conference means, etc.). Preferably, the first and second predetermined values D1, D2 are substantially equal.

Thus, whenever two avatars 2, 3 are either close enough together (situation A), or close enough to a specific graphical object 12, 13, 14 (situation B), the communications interface reacts to this specific relative positioning by setting up a communications channel (which is a telecommunications channel in this example) between the two participants represented by the avatars 2, 3 in question, in such a manner as to enable them to hold a conversation without themselves needing to activate the communications channel in question. The communications interface of the invention thus enables two graphical avatars 2, 3 to be interconnected automatically and preferably immediately whenever they are separated by a distance d less than or equal to the first predetermined value D1. This interconnection of the avatars in question (which interconnection may be visible on the screen, as explained in more detail below) enables the participants represented by respective ones of the avatars 2, 3 in question to converse in real time through their avatars. The term "discussion channel" is used herein to designate any system interconnecting the participants so as to enable them to dialogue in real time, be it by texting, by telephoning, or by video-conferencing. The discussion channel is thus a conversation channel that makes it possible for at least two participants to converse remotely.

In the situation B, the graphical object 2, 13, 14 may, for example, be constituted by a simple graphical element that is inactive and inert, and that merely acts as a geographical visual marker forming a rallying point for the participants. By gathering around the rallying point in question, the participants can thus automatically be put into communication with one another via the network to which their terminals that include the screens are connected. However, it is possible, as in the variants shown in FIGS. 10 to 12, for the graphical object to include and preferably to constitute an active window 12, 13, 14 that, for example, displays the elements of a game (such as the game of tennis shown in FIG. 10) preferably controlled by one or more participants who have their graphical avatars at distances d' from the graphical object 12, 13, 14 that are less than the second predetermined value D2. In another possibility, shown in FIG. 11, the graphical object in question may include and preferably constitute a window that is broadcasting an audiovisual or television content (a televised football match in this example).

The participants who have their graphical avatars 2, 3, 4, 6, 8, 9 close enough to the graphical object 13 can then chat among themselves and thus comment on the content coming from the window of the graphical object 13.

In the example shown in FIG. 12, the graphical object 14 includes a window showing the logo of an on-line radio station (Internet radio) that is broadcasting a content that can be commented on and discussed live by the participants who have their avatars 2, 3, 5 close enough to the graphical object 14 in question.

Advantageously, the graphical object 12, 13, 14 is activatable/deactivatable, and is designed to be activated when the distance d' between a graphical avatar and said predetermined graphical object 12, 13, 14 is less than or equal to said second predetermined value D2, activation of said predetermined graphical object 12, 13, 14 advantageously making interaction possible between the participant represented by the graphical avatar in question and said graphical object 12, 13, 14. Activation of the graphical object 12, 13, 14 may, for example, correspond merely to a change of appearance in said object (change of color, change of size, etc.) or, preferably, to the start of a more complex process such as starting a game controlled by the graphical avatars in question (game of tennis in the variant shown in FIG. 10), or such as access to broadcasting of an audiovisual content, for participants with their graphical avatars close enough to the graphical object 13, this broadcasting ceasing automatically whenever participants move their graphical avatars away from the graphical object 13 to distances d' greater than the second predetermined value D2. In this particularly advantageous example, the participant of a given graphical avatar perceives the audiovisual content broadcast (or merely audio content broadcast in the variant shown in FIG. 12) only when said participant moves his/her avatar close enough to the graphical object 13, 14 in question. Whenever the participant represented by the avatar in question moves said avatar away from said graphical object, the broadcast ceases for the said participant (the other participants who have their avatars close enough to the graphical object 13, 14 still having access to the content being broadcast).

Advantageously, each communications channel set up automatically by the interface between two avatars that find themselves in at least one of the above-mentioned two situations A and B includes communications windows (referenced 15 to 24 in the accompanying figures) that are associated visually with the two graphical avatars in question, said communications windows 15-24 being designed to display, for example, a text and/or an image that is optionally animated, in order to enable discussion to take place between the participants represented by the graphical avatars in question.

Thus, in the example shown in FIG. 2, a window 15 pops up and is displayed in the manner of a comic-strip speech bubble. The window 15 in FIG. 2 contains a text that has been written and input (e.g. on a keyboard or keypad) by the participant represented by the graphical avatar 3 to which the communications window 15 points. The participant embodied virtually by the graphical avatar 2 thus sees the communications window 15 pop up on the screen and can read the text that has been sent to him/her by the participant embodied virtually by the graphical avatar 3. The participants represented by the other Graphical avatars and who do not have any communications channel set up with the participant represented by the graphical avatar 3 do not see the communications window 15 pop up. It is thus possible for the participants of the avatars 2, 3 shown in FIGS. 1 to 3 to chat with each other, by inputting the texts of their participations by means of a keyboard or keypad, for example.

The principle consisting in causing the text of a message sent by a given participant to appear in a window 15 of the comic-strip speech bubble type enables the other participants to identify the sender of the message extremely rapidly and intuitively, without any risk of error in group conversations. A message can be sent to a given attendee in the following manner. Once the discussion channel has been set up automatically by the interface, it is possible for a given participant, embodied, for example, in FIG. 3, by the graphical avatar 2, to type the text of the message on and in the graphical avatar 3 of the other participant with whom the given participant wishes to dialogue. It thus suffices for the participant embodied by the graphical avatar 2 to click on and in the graphical avatar 3 in order to cause a communications window 16 to open within the graphical avatar 3, into which window the participant embodied by the graphical avatar 2 can type a message directly. When the message is confirmed, e.g. conventionally by pressing the "enter" key of a computer keyboard, the message in question appears immediately in the form of a speech bubble that points towards the graphical avatar 2 of the sender of the message, the speech bubble and the message in question preferably being visible only by the participant embodied by the graphical avatar 3. A genuine dialogue of the chat type can thus be established between the two participants, this dialogue being extremely natural and simple to control.

The communications interface of the invention thus makes it very easy to start an impromptu conversation with an attendee because it suffices for the given participant to move their own avatar dose enough to the avatar of another participant in order to set up a discussion channel automatically between them.

It is also possible, and this constitutes a particularly advantageous function of the interface of the invention, for a participant using the interface to send the same message simultaneously to all of the participants with whom discussion channels have been set up automatically. The participant in question, embodied, for example, by the graphical avatar 2 in FIGS. 1 to 3, may, for example, type a message directly in their own avatar 2. To this end, the participant in question may, for example, click on the graphical avatar 2 (by using a mouse, or a finger when the screen is a touchscreen), thereby causing an input window to appear in said graphical avatar 2, into which window the participant types a message on the keyboard or keypad and confirms it, e.g. by pressing on the "enter" key. The message is then sent simultaneously to all of the participants with whom the interface has set up discussion channels automatically, i.e. all of the participants who have their respective graphical avatars in one and/or the other of the above-mentioned positioning situations A and B. In addition, this constitutes a particularly advantageous potential feature of the invention because it makes it particularly simple to create a discussion group around a given participant. It is also quite possible for the communications channel, as set up when one and/or the other of the above-mentioned avatar positioning situations A and B is present, to allow only group messages to be sent. Advantageously, it is also possible, even in the absence of the above-mentioned positioning situations A and/or B, for each participant to engage another participant directly by selecting, on the screen (e.g. by a mouse click) the graphical avatar of the other participant in question so as to cause a writing text field (of the same type as the communications window 16) to appear that makes it possible to send an individual message to that participant regardless of the positioning of the graphical avatars in question. Thus, in a particularly advantageous embodiment, the discussion channel automatically set up by the communications interface in one and/or the other of said situations A and B consists of a channel that enables the user to input a message that is simultaneously sent simultaneously to all of the participants who have their respective graphical avatars in one and/or the other of the situations A and B in question, and is readable by all of them.

In order to enable the participants to have an overall view of the conversations, it is also possible for a history window 26 to pop up in the vicinity of the graphical avatars 2, 3, 4, 5 in question (cf. FIG. 12), this window 26 displaying in chronological order all of the participations sent by the members of a discussion group.

Figure 9:
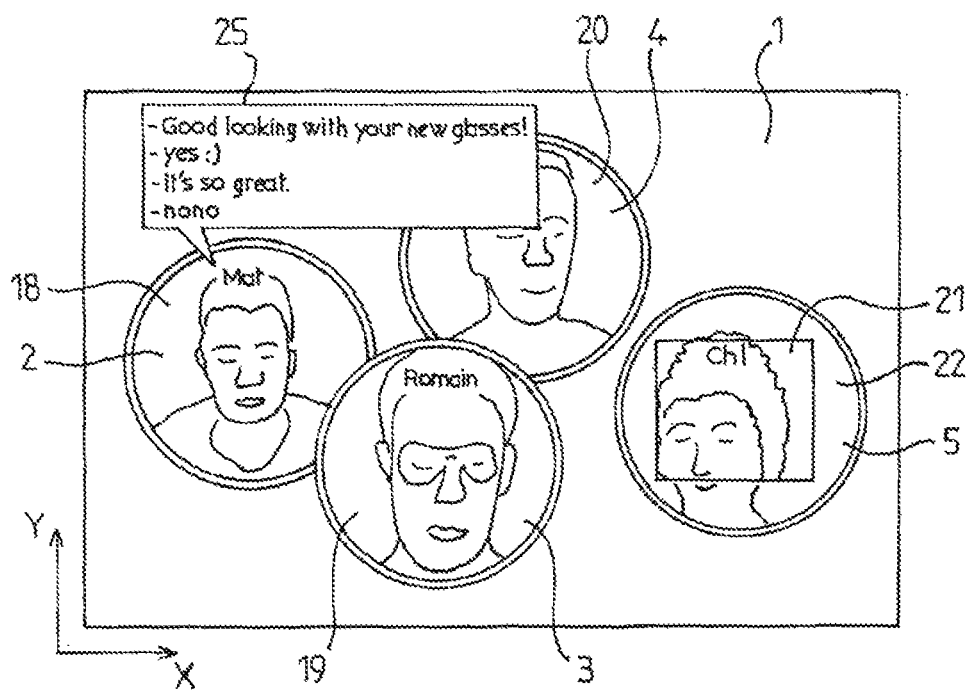
FIG. 9 is a screenshot showing a discussion group involving four participants, the discussion taking place both via an audio-video channel and via text-based chat windows.

The use of a chat-type system by way of a discussion channel is naturally not absolutely essential. For example, it is possible, as shown, in particular in FIGS. 9 and 12, for the discussion channels set up automatically by the interface as a function of the positioning of the graphical avatars in question to set up video or audio-video communications between the participants of the avatars in question, as shown in FIG. 9. Occurrence of one and/or the other of the above-mentioned situations A and B then advantageously makes it possible automatically to cause a video window to pop up in the graphical avatar 2, 3, 4, 5 of each participant in question, which window shows, for the attention of the participants in the discussion group, the real-time image of the participant embodied by a given graphical avatar. Naturally, this assumes that each participant is equipped with video camera means of the webcam type or of some other type. Automatic setting up of a discussion channel between any two participants then amounts to automatically activating the playing of the images collected by the camera means available to the participants in question in respective windows associated with their graphical avatars 2, 3, 4, 5. As shown in FIG. 9, each such window preferably occupies the entire avatar in question, so that each avatar is then formed directly by a video display window.

Advantageously, the communications interface of the invention is also designed to set up a discussion channel automatically between first and second ones of said participants when the respective distances d between each of the two graphical avatars 2, 8 (cf. FIG. 4) representing respective ones of said first and second participants and a third other graphical avatar 7 representing a third other participant are less than or equal to said first predetermined value D1, the setting up of said discussion channel enabling said first and second participants to converse with each other. By means of this feature, it is possible for the communications interface to set up discussion chains made up of participants who have their respective graphical avatars constituting the links of a common graphical chain, each avatar being separated from each of its two closest neighbors by a distance that does not exceed the predetermined value D1.

Even more preferably, the communications interface is also designed to set up discussion channels automatically between all of the participants who are represented by respective graphical avatars that belong to a group of avatars 2, 3, 4, 5, 6, 7, 8 (cf, FIG. 4), in which each member of the group in question is distant from at least one other member by a distance d less than or equal to said first predetermined value D1. By means of this particularly advantageous characteristic, the interface makes it possible to create clusters of avatars such as the cluster shown in FIG. 4, it being possible for each member of a cluster to communicate with all of the other members of the cluster, insofar as discussion channels are automatically set up by the interface between all of the members of a given cluster. It is thus extremely easy and intuitive to create discussion groups of limited size by clustering avatars in a manner such that each avatar is separated from at least one other avatar (and possibly more than only one other avatar) by a distance d less than or equal to the predetermined value D1, this clustering triggering setting up of generalized communications whereby all of the avatars making up the group in question are put into communication with one another. It is thus possible, for a participant embodied by an avatar that belongs to such a discussion group (e.g. the graphical avatar 4 in FIG. 4), to type a message in their own avatar, which message is immediately and simultaneously broadcast to all of the other avatars 1, 2, 3, 5, 6, 7, 8 in the group, in compliance with the above-described communications protocol.

It is naturally also possible, within such a discussion group, to converse with oily some of the participants by clicking on their respective avatars as explained above.

By means of this particularly advantageous variant of the communications interface of the invention, it is possible to obtain a discussion group in fast, intuitive and user-friendly manner, merely by clustering graphical avatars 2-8 virtually embodying the attendees of the discussion group in question. This clustering, that consists in making provision for each graphical avatar to be separated from at least one other adjacent graphical avatar by a distance less than or equal to the value D1, makes it possible for all of the participants represented by the avatars 2-8 clustered in this way to be put into immediate and simultaneous communication, via their respective avatars.

Figures 5, 6:
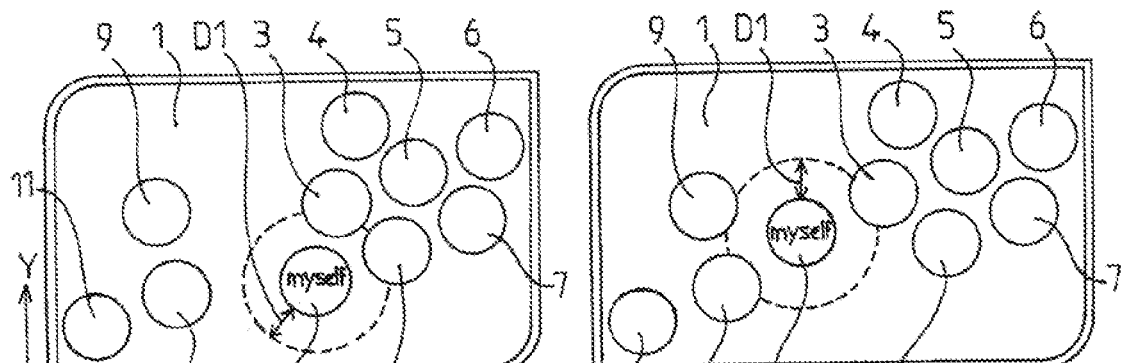
FIGS. 5 to 7 diagrammatically show how discussion groups are formed as a function of the relative position of the avatars that are present.
Figures 7, 8:
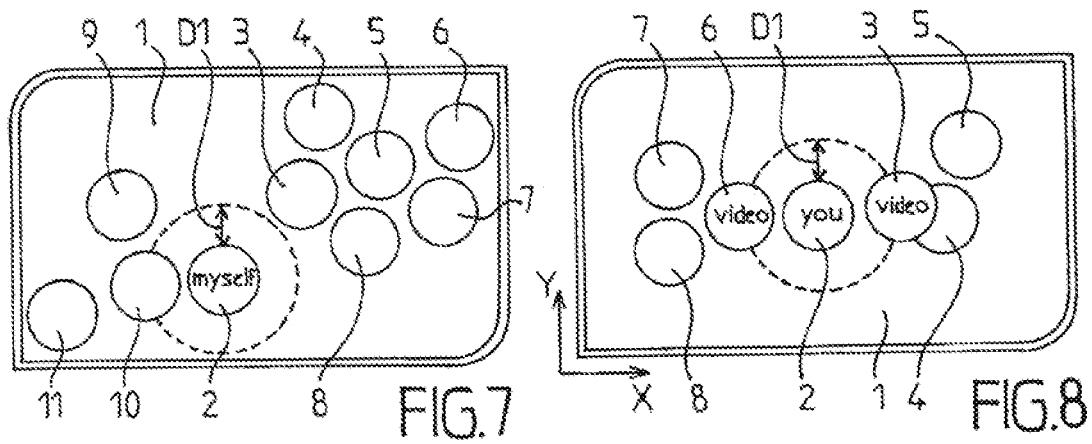
FIG. 8 is a diagrammatic view showing the principle underlying implementation of an audio-video connection between various participants.

FIGS. 5 to 7 show various situations in which discussion groups are formed. Thus, in the example shown in FIG. 5, a first discussion group is formed by the graphical avatars 2, 3, 4, 5, 6, 7, 8. The graphical avatars 9, 10, 11 do not belong to this discussion group insofar as they are too far away from the closest graphical avatar 2 (i.e. distant by distances greater than the first predetermined value D1). In the example of FIG. 6, all of the avatars present in the image and referenced 2, 3, 4, 5, 6, 7, 8, 9, 10, 11 belong to the same discussion group. Finally, in the example of FIG. 7, a first discussion group is formed by the graphical avatars 2, 9, 10, 11, while the other graphical avatars 3, 4, 5, 6, 7, 8 do not belong to this first group because they are distant from the closest graphical avatar 2 by distances greater than the first predetermined value D1.

As mentioned above, the communications interface of the invention advantageously makes it possible to combine videoconferencing and chat means, without having to use separate interfaces, Each participant may thus use all of the communications means (video, audio, and chat) simultaneously, in a group or in private. However, it can be advantageous, as shown in FIG. 8, to reserve the setting up of video communications channels between a given graphical avatar 2 and other avatars to only those graphical avatars 3, 6 that are distant from said graphical avatar 2 by distances less than or equal to the first predetermined value D1. The other graphical avatars 4, 5, 7, 8 belonging to the same discussion group as the avatars 2, 3, 6 are then put into communication with the participant represented by the graphical avatar 2 via communications channels of the chat type only.

Advantageously, as appears in particular from FIGS. 1 to 4 and 12, each graphical avatar 2, 3, 4, 8 is surrounded continuously by a corresponding graphical margin 2A, 3A, 4A, 5A, 6A, 7A, 8A, of width that is equal to the first predetermined value D1. Said graphical margin 2A, 3A, 4A, 5A, 6A, 7A, 8A thus advantageously enables the participants to visualize the first predetermined value D1, thereby making it easy to determine, at a glance, whether either of the above-mentioned situations A and B is occurring, or both of them. For example, in FIG. 1, it can be seen that the graphical avatar 3 is clearly situated outside the graphical margin 2A, which means that the graphical avatars 2 and 3 are too far apart for a communications channel to be set up automatically between them via the interface. Preferably, each graphical margin 2A, 3A, 4A, 5A, 6A, 7A. BA is in the form of a transparent or translucent halo that surrounds the corresponding graphical avatar 2, 3, 4, 5, 6, 7, 8. In the preferred configuration in which the graphical avatars 2, 3, 4, 5, 6, 7, 8 are two-dimensional, each graphical margin is then also two-dimensional and surrounds, preferably completely, the corresponding graphical avatar in the same plane as the plane in which the avatar in question extends. Preferably, each graphical avatar 2-8 has a main body that is substantially disk-like, said body preferably being a disk, each graphical margin 2A-8A then being in the form of a circular ring surrounding said main body concentrically, as shown in the figures.

Each graphical margin then advantageously extends between a circular inner edge 20A that is preferably superposed on or that coincides with the outer edge of the main body of the avatar in question and a circular outer edge 200A; the inner edges 20A, 30A, 40A, 60A, 60A, 70A, 80A and the outer edge 200A, 300A, 400A, 500A, 600A, 700A, 800A being separated by a distance corresponding to the width of the graphical margin, which distance is thus equal to the first predetermined value D1.

Preferably, the graphical margin 2A, 3A, 4A, 5A, 6A, 7A, 8A of any given graphical avatar 2, 3, 4, 5, 6, 7, 8 is visible only on the screen available to the participant embodied by that graphical avatar 2, 3, 4, 5, 6, 7, 8. This function is shown, in particular, in FIG. 1, FIG. 1 is a view of the screen available to the participant represented by the graphical avatar 2. It appears from FIG. 1 that, on their screen, the participant in question sees only the graphical margin 2A that surrounds their own avatar 2. Conversely, the graphical margin of the other avatar 3 is not displayed on the screen available to the participant embodied by the graphical avatar 2. Similarly, on the screen, the participant represented by the graphical avatar 3 sees the graphical margin 3A surrounding their own avatar but does not see the graphical margin 2A surrounding the graphical avatar 2. This makes it possible to facilitate the legibility of the interface by avoiding drowning each participant in unnecessary information.

Advantageously, the appearance of each graphical margin 2A, 3A, 4A, 5A, 6A, 7A, 8A varies as a function of the distance that separates each graphical avatar from another graphical avatar or from a graphical object 12, 13, 14. For example, the graphical margin 2A, 3A, 4A, 5A, 6A, 7A, 8A may be substantially translucent or transparent so long as the avatar in question is separated from the other avatars by a distance d greater than the first predetermined value D1 and from the graphical objects 12, 13, 14 by a distance d' greater than the second predetermined value D2. Such a situation is visible, for example, in FIG. 1, in which the graphical margin 2A is substantially transparent, except for its circular outer edge 200A that is represented by an opaque circular line in order to visualize the outline of the graphical margin 2A. The graphical margin 2A is designed, for example, to become opaque whenever the graphical avatar 2 in question finds itself in one or the other of the above-mentioned situations A and B.

This can be seen, for example, in FIG. 2, in which the graphical margin 2A has become fully opaque and therefore masks the virtual space 1 that lies behind it.

Figure 4:
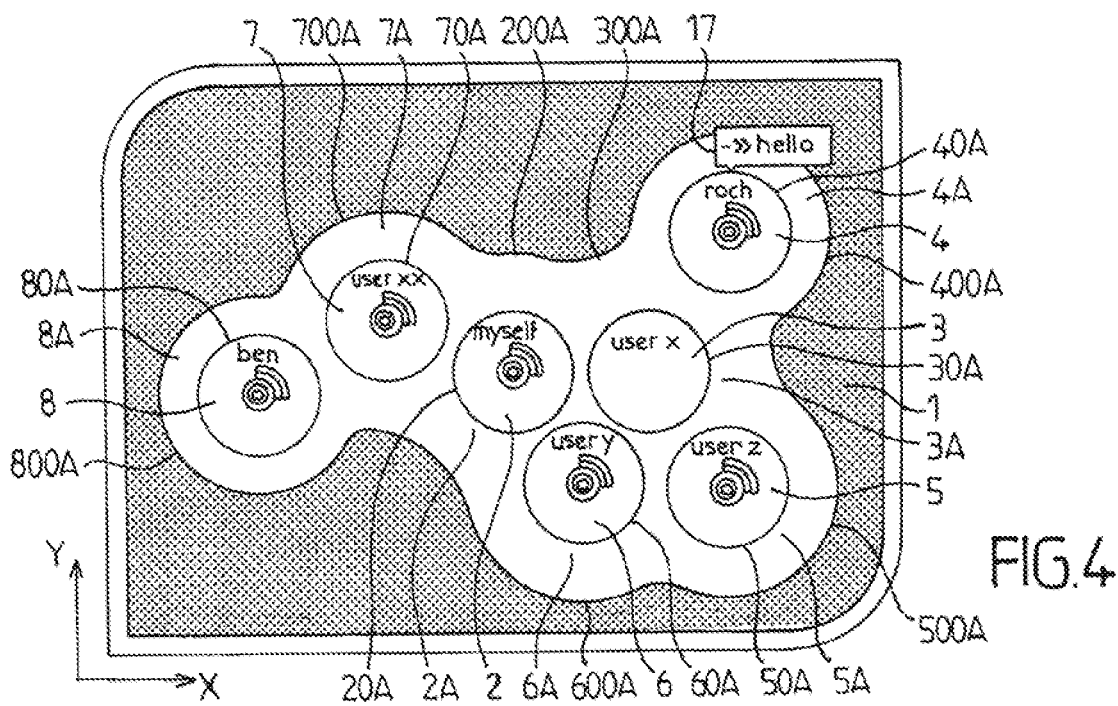
FIG. 4 is a screenshot showing a discussion group formed of seven participants who can participate simultaneously in the same group discussion.

Preferably, the graphical margins 2A, 3A, 4A, 5A, 6A, 7A, 8A are designed so that, when they are partially superposed (i.e. when the distance d between two graphical avatars 2, 3 is less than the first predetermined value D1, as shown in FIG. 2), they merge automatically in their partial superposition zone, in a manner such as to form only one single resulting graphical margin that encompasses all of the graphical avatars 2, 3 in question, as shown in particular in FIGS. 2 to 4. This local merging of the margins in their overlap zone is visually similar to a phenomenon of coalescence, i.e. of at least local merging of the graphical margins 2A, 3A, 4A, 5A, 6A, 7A, 8A. Advantageously, the single graphical margin resulting from the merging of the graphical margins of graphical avatars belonging to the same discussion group is visible by all of the users of the interface. It is thus possible, at a glance, to identify a discussion group immediately insofar as all of the graphical avatars embodying the participants of the group in question are encompassed in a single common graphical margin that is visible (e.g. of opaque white color as in the variant shown in FIG. 4). Thus, whenever two graphical avatars 2, 3 come closer to each other to within a distance d that is less than or equal to the first predetermined value D1, their respective graphical margins 2A, 3A become visible, change appearance (e.g. they go from a substantially transparent appearance to an opaque appearance), and they merge locally so as to form a single resulting graphical margin that is visible to all of the participants.

In another aspect, the invention also provides a communications method for communications between participants having respective screens available to them, the method in question advantageously being implemented by means of the above-described communications interface and corresponding to operation of the communications interface in question.

In the communications method of the invention, a virtual space and graphical avatars 2, 3, 4, 5, 6, 7, 3, 9, 10, 11 that represent respective ones of said participants are displayed on said screens, each of the participants controlling the movements of their respective graphical avatars in said virtual space 1, as explained above. Preferably, and for the reasons already mentioned above, the virtual space 1 is two-dimensional.

In the method of the invention, a discussion channel is set up automatically between two of said participants when:
  either the distance d between the two graphical avatars 2-11 representing respective ones of said two participants is less than or equal to a first predetermined value D1; or
  the distances d' between a graphical object 12, 13, 14 positioned in said virtual space 1 and each of the two graphical avatars 2, 3 representing respective ones of said two participants are less than or equal to a second predetermined value D2;
  setting up said discussion channel enabling said two participants to converse with each other.

Advantageously, the communications method in question is a method in which a discussion channel is also set up automatically between first and second ones of said participants when the distances d between each of the two graphical avatars 2, 8 representing respective ones of said first and second participants and a third graphical avatar 7 representing a third other participant are less than or equal to said first predetermined value D1, setting up said discussion channel enabling said first and second participants to converse with each other, as explained in detail above with reference to the communications interface.

Even mere preferentially, discussion channels are advantageously set up automatically between all of said participants who are represented by respective graphical avatars 2, 3, 4, 5, 6, 7, 8 that belong to a group of avatars, in which group each member is distant from at least one other member by a distance d less than or equal to said first predetermined value D1, as explained in detail above in the description of the communications interface.

Finally, the invention provides a computer program including computer program code means adapted to execute the steps of a method as described above when said program is executed on a computer or on equivalent hardware (smartphone, touchscreen tablet, etc.).

The invention also provides such a computer program as implemented on a computer-readable medium on which such a program is recorded. The term "computer" should be understood as being used in its broadest acceptation and designates equally well a conventional personal computer, a smartphone, or a graphics tablet, for example.

It appears from the above that the invention makes it possible, in particular, to make communications much easier between remote participants interconnected via the Internet. In its preferred variant, one of the advantages of the invention lies, in particular, in the two-dimensional nature and the circular shape of the graphical avatars. The circle is an extremely elementary shape that is, in addition, a dimensional extension of the point, or node of a network. Each graphical avatar thus resembles a bubble with which notions of lightness, mobility, agility, etc. are generally associated. Each graphical avatar may thus serve as a communications window (a video image may be played within the graphical avatar, within which an input window for chat text may also appear, as mentioned above). In addition, each graphical avatar may be customized, e.g. along the following lines:
  the communications capacities of the participant represented by a given graphical avatar may be displayed on or around the graphical avatar in question (signal indicating presence on-line, signal indicating presence of a camera, of a microphone, of a specific application, etc.);
  the social connections of a given participant may be displayed by their graphical avatar (membership of a social network, curriculum vitae or "résumé", Uniform Resource Locator (URL) address of a personal website, personal profile, etc.); and
  the used and contextual applications of a given participant may also be displayed by an avatar (game and application being used: poker, shared reading list, etc.).

Naturally, the communications interface may enable each participant to customize their avatar by changing the color, texture, or transparency thereof, by applying a "skin" to it, by adding a personal image or a logo, or indeed by adding video effects affecting the image from the webcam of the participant in question.

As explained in detail above, the invention makes it possible, in a preferred variant, to have a clear vision of discussion groups that are dynamic and that enable any participant to join or to leave a group easily, and to talk in private or to an entire group without any complexity and with unparalleled user-friendliness, making it possible, if the need arises, to use a plurality of modes of communication (chat, video, audio, telephone, etc.) simultaneously, in a group or in private.

It is also possible, by means of the invention, to create virtual events easily. For this purpose, it suffices to place graphical objects 12, 13, 14 corresponding to a given event in a virtual space 1. In general, the communications interface advantageously makes it possible to implement the following principle: what each of the participants who have their respective graphical avatars moving in a given virtual space sees in said virtual space is seen simultaneously by all of the other participants who have their graphical avatars in the same place.

The communications interface may thus be implemented in the context of a platform subdivided into a plurality of virtual spaces in which the graphical avatars move between various interactive elements. Each virtual space (such as the space 1) may be created and managed by a group or by a user who can define the style of the virtual space, the access authorizations therefor, and the contents thereof. A topic search tool advantageously makes it possible to find the contents across all of the spaces or in the current space. On entering a given space, participants can advantageously find their way around by means of a map of the contents and of the users who are sufficiently close to the location at which each participant is to be found.

By moving their graphical avatars in a given virtual space 1, web users discover synchronized interactive contents therein in real time. For example, these elements may be links, photo galleries, synchronized videos, more specialist elements such as interactive games, live audiovisual contents, blog elements or other elements relating to social networks. From this point of view, the platform in question, that constitutes one of the aspects of the invention, forms a social network as such, which advantageously makes it possible to detect the presence of contacts (contacts encountered previously or social network friends) and their positions in the virtual space 1.

This network offers the advantage of being extremely simple and easy to grasp, and does not supplant existing social networks, because it can limit itself merely to approving lists of contacts. Each of the participants may also create their own virtual spaces 1 in which other participants can browse via their avatars. A mouse can be used to create the virtual space by using preconceived interactive elements (reading list, game, whiteboard, interactive map, blog element, newspaper article, radio or TV stream, etc.).

By means of the invention, professionals may create virtual spaces 1 consisting of rooms for work, for conferences, for tuition, or for presenting events, e.g. advertising events. The invention also makes it possible to obtain very rapid group effects through instantaneous interest about a common content (cf. the examples in FIGS. 10 to 12). It is thus possible to meet unknown users who are interested in the same topics because they are encountered in a specific topic space. In addition, as explained above, the list of attendees taking part in a conversation is dynamic, since each avatar can chance group immediately, connect up to a group, or even separate two groups (see the examples of FIGS. 5 to 7).

SUSCEPTIBILITY OF INDUSTRIAL APPLICATION

The invention is susceptible of industrial application in design and use of communications interfaces.

The invention claimed is:
1. A system comprising:
a memory storing instructions; and
a processor coupled to the memory and configured by the instructions to generate a communications interface which can be used simultaneously by remote participants each having a respective display screen,
said interface including a two-dimensional virtual space and two-dimensional graphical avatars respectively associated with each of said participants, each graphical avatar being movable in said virtual space, said virtual space and said graphical avatars being displayed on said display screens,
said communications interface also including a controller enabling each of the participants to control the movements of their respective graphical avatars within said virtual space,
wherein discussion channels are automatically set up between at least two of said participants represented by two respective graphical avatars, when said, two graphical avatars are close enough together to form a dynamic discussion group, setting up said discussion channels enabling said participants to converse with each other, in real time, by audio-video communication, wherein ail of the graphical avatars in said dynamic discussion group are encompassed in a single common graphical margin that is visible to all participants and makes it possible to identify said discussion group.

2. A system according to claim 1 wherein said automatic setting up of discussion channels between said participants involves automatically activating the playing of images collected by camera means available to the participants in question in respective windows.

3. A system according to claim 1, wherein each graphical avatar is of circular shape.

4. A system according to claim 1, wherein graphical avatars are each, surrounded, by a respective graphical margin, the appearance of each graphical margin varying as a function of the distance that separates each graphical avatar from another graphical avatar or from a graphical object.

5. A system according to claim 1, wherein said communication interface enables each participant to engage another participant directly by selecting, on the screen the graphical avatar of the other participant in question so as to cause a writing text field to appear that makes it possible to send an individual message to that participant regardless of the positioning of the graphical avatars in question.

6. A system comprising:
a memory storing instructions; and
a processor coupled to the memory and configured by the instructions to generate a communications interface which can be used simultaneously by remote participants each having a respective display screen,
said interface including a two-dimensional virtual space and two-dimensional graphical avatars respectively associated with each of said participants, each graphical avatar being movable in said virtual space, said virtual space and said graphical avatars being displayed on said display screens,
said communications interface also including a controller enabling each of the participants to control the movements of their respective graphical avatars within said virtual space,
wherein discussion channels are automatically set up between at least two of said participants represented by two respective graphical avatars, when said two graphical avatars are close enough together to form a dynamic discussion group, setting up said discussion channels enabling said participants to converse with each other, in real time, by audio-video communication,
wherein said communication interface enables each participant to engage another participant directly by selecting, on the screen the graphical avatar of the other participant in question so as to cause a writing text field to appear that makes it possible to send an individual message to that participant regardless of the positioning of the graphical avatars in question.

7. A system according to claim 6 wherein said interface includes a history window displaying the participations sent by the members of said discussion group.

8. A system according to claim 6 wherein said automatic setting up of discussion channels between said participants involves automatically activating the playing of images collected by camera means available to the participants in question in respective windows.

9. A system according to claim 6, wherein all of the graphical avatars in said dynamic discussion group are encompassed in a single common graphical margin that is visible to all participants and makes it possible to identify said discussion group.

10. A system comprising:
a memory storing instructions; and
a processor coupled to the memory and configured by the instructions to generate a communications interface which can be used simultaneously by remote participants each having a respective display screen,
said interface including a two-dimensional virtual space and two-dimensional graphical avatars respectively associated with each of said participants, each graphical avatar being movable in said virtual space, said virtual space and said graphical avatars being displayed on said display screens,
said communications interface also including a controller enabling each of the participants to control the movements of their respective graphical avatars within said virtual space,
wherein discussion channels are automatically set up between at least two of said, participants represented by two respective graphical avatars, when said two graphical avatars are close enough together to form a dynamic discussion group, setting up said discussion channels enabling said participants to converse with each other, in real time, by audio-video communication,
wherein said communications interface displays on or around each graphical avatar the communications capacities of the participant represented by said graphical avatar.

11. A system according to claim 10 wherein said communications interface displays said communications capacities in the form of a signal indicating at least one of the following (a) to (c):
(a) presence on-line,
(b) presence of a camera,
(c) presence of a microphone.

12. A system according to claim 10 wherein all of the graphical avatars in said dynamic discussion group are encompassed in a single common graphical margin that is visible to all participants and makes it possible to identify said discussion group.

13. A system according to claim 10 wherein said communication interface enables each participant to engage another participant directly by selecting, on the screen the graphical avatar of the other participant in question so as to cause a writing text field to appear that make possible to send an individual message to that participant regardless of the positioning of the graphical avatars in question.

14. A system comprising:
a memory storing instructions; and
a processor coupled to the memory and configured by the instructions to generate a communications interface which can be used simultaneously by remote participants each having a respective display screen,
said interface including a two-dimensional virtual space and two-dimensional graphical avatars respectively associated with each of said participants, each graphical avatar being movable in said virtual space, said virtual space and said graphical avatars being displayed on said display screens,
said communications interface also including a controller enabling each of the participants to control the movements of their respective graphical avatars within said virtual space,
wherein discussion channels are automatically set up between at least two of said participants represented by two respective graphical avatars, when said two graphical avatars are close enough together to form a dynamic discussion group, setting up said discussion channels enabling said participants to converse with each other, in real time, by audio-video communication, with a video window automatically popping up in the graphical avatar of each participant in question.

15. A system according to claim 14 wherein each graphical avatar is of circular shape.

16. A system according to claim 14 wherein said video window occupies the entire graphical avatar in question, so that each graphical avatar is formed by a respective video display window.

17. A system according to claim 16, wherein each graphical avatar is of circular shape.

18. A system according to claim 14 wherein said communications interface displays or on around each graphical avatar the communications capacities of the participant represented by said graphical avatar, and/or said communications interface enables each participant to customize their avatar by adding a personal image or a logo to it.

19. A system according to claim 14 wherein said communications interface enables each of said participants to input a text and causes said text to appear in a window that pops up and points to the graphical avatar of the participant who input said text.

20. A system according to claim 14 wherein said communications interface includes at least one window broadcasting an audiovisual content or an audio content, each participant perceiving the audiovisual content broadcast or audio content broadcast only when said participant moves his/her avatar close enough to said broadcasting window.

* * * * *